A. A. C. OHL.
ATTACHMENT FOR THE HANDLES OF BROOMS AND THE LIKE.
APPLICATION FILED OCT. 6, 1914.

1,160,440.

Patented Nov. 16, 1915.

WITNESSES:
John C. Sanders
Albert F. Heuman

INVENTOR
August Adolf Charles Ohl
BY M. Wallace White
ATTY

UNITED STATES PATENT OFFICE.

AUGUST ADOLF CHARLES OHL, OF ALTONA, GERMANY.

ATTACHMENT FOR THE HANDLES OF BROOMS AND THE LIKE.

1,160,440. Specification of Letters Patent. Patented Nov. 16, 1915.

Application filed October 6, 1914. Serial No. 865,227.

*To all whom it may concern:*

Be it known that I, AUGUST ADOLF CHARLES OHL, a subject of the German Emperor, and residing at Altona, in the Kingdom of Prussia, in the German Empire, have invented certain new and useful Improvements in Attachments for the Handles of Brooms and the like, of which the following is a specification.

This invention relates to an attachment of handles or sticks of brooms and similar articles of which the main body is made of wood or similar material.

The object of the invention is to provide for easily and speedily attaching the handle or stick to the body of a broom or the like connecting the two parts in such manner, that they are firmly held together and cannot be loosened by accident or unintentionally.

Attachments known heretofore have the drawback that the handle must beforehand be firmly attached to a socket of special construction and that it requires some time before the appliance is ready for use. Moreover the attachment is not very firm and can easily become loosened while in use. The new device, forming the subject of the present invention does away with these drawbacks. The handle or stick is loosely inserted into a socket or tubular plug which may be held into the opening of the broom body and by a short twist of the handle and the closing of a clamp the connection is carried out in a few seconds. The said plug is provided with movable claws that may project out laterally by rotating the handle, which is coupled to a spindle operatively connected with the claws by a suitable gearing.

Figure 1:
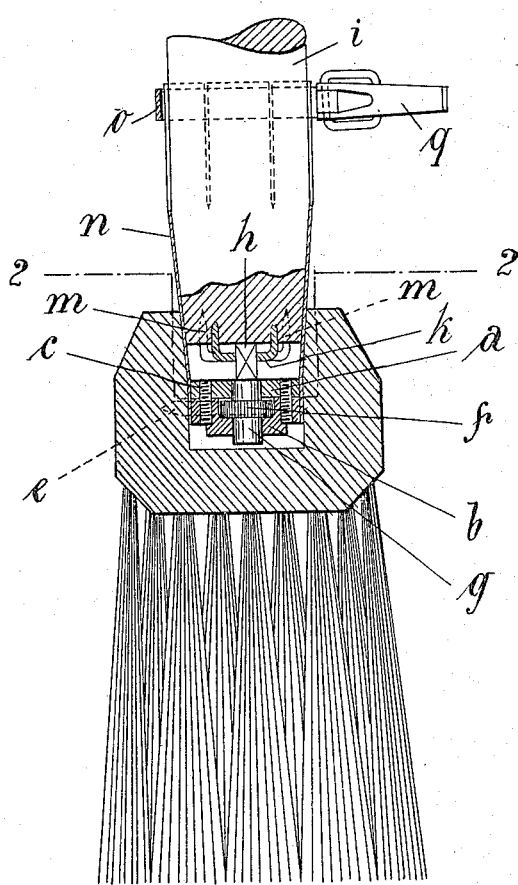
Figure 3:
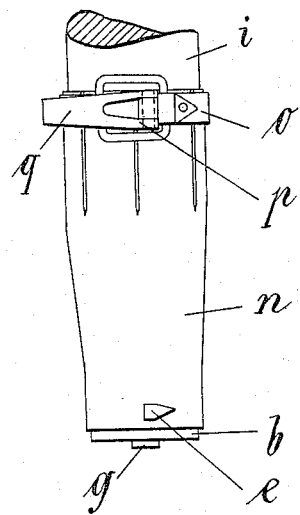
Figure 4:
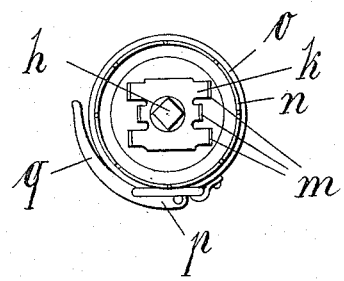
Figure 2:
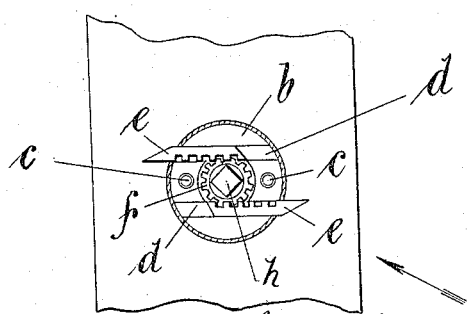

Figure 1 of the drawing is a section of a broom attached to a stick by means of the new device. Fig. 2 is a section drawn to the line 2—2 of Fig. 1. Fig. 3 is an elevation of the tubular plug, and Fig. 4 is an end view of the same.

The plug consists of two disks $a$ and $b$ firmly connected together by screws $c$ and attached to a socket $n$ by any suitable means. The lower disk $b$ is provided with two parallel slots $d$ in which slide claws $e$ provided with rack teeth adapted to be engaged by a pinion $f$ firmly attached to the spindle $g$. The claws $e$ are pointed at one end, as clearly shown in the drawing. The upper end of the spindle $g$ which is prevented from moving longitudinally by the pinion $f$ being suitably incased in between the disks $a$ and $b$, projects from the disks. The projecting end $h$ of the spindle is squared or otherwise formed prismatic and a plate $k$ which has a corresponding opening in its center may be secured in any suitable manner to the end of the broom handle. By way of example the plate $k$ is provided with prongs $m$, that are driven into the end of the handle $i$ for a short distance. This plate evidently can be easily detached from the handle. Should it be desired to firmly secure the plate $k$ to the handle $i$ the prongs $m$ are fully driven into the timber. In this case it will be necessary to provide an opening at the end of the stick to allow the spindle $g$ to project into the handle. When the prongs however are not fully driven into the wood, Fig. 1 there is no necessity of making such a hole in the stick.

The socket $n$ is provided with a number of longitudinal slits so as to produce a clamp which firmly holds the handle. In the construction shown a steel band $o$ is adapted to embrace the upper slit part of the socket. One end of the steel band may be soldered or otherwise attached to the socket, a clasp or knuckle-lever-joint $p$ of known construction being used for closing the ends of the socket against the handle, the closure being carried out by turning the handle $q$ from the position shown in Fig. 1 to that shown in Fig. 4.

To connect a stick or handle to the broom or the like, the stick, which at its end may be shaped to fit the socket is first provided with the plate $k$ whereupon it is inserted into the socket, in such way, that the plate $k$ catches over the square part $h$ of the spindle $g$. Before the joint or clasp $p$ is closed the plug $a$, $b$, $n$ is inserted with the handle $i$ into the opening of the body of the broom whereupon the stick $i$ is rotated within the socket $n$, thus rotating the pinions $f$ and driving the claws $e$ into the wood of the broom. This done, the handle $q$ is closed upon the band $o$ thus closing the clasp. Evidently great force may be applied to the handle in rotating the same, and the consequence is, that the claws $e$ are driven comparatively deep into the wood, thus obtaining a very firm attachment. It is evident that the connection can be carried out in a few seconds so that it is impossible to loosen the attachment, when the connection is completed.

I claim:

1. Attachment for broom handles or the like, comprising a tubular plug, movable claws, guides on the plug for the claws, means to move the claws longitudinally with respect to their dimension and laterally from the plug, such means being adapted to be operated by rotating the handle.

2. Attachment for broom handles or the like, comprising a tubular plug, movable claws, guides on the plugs for the claws, means to move the claws longitudinally, such means being adapted to be operated by rotating the handle, a clamp for firmly securing the tubular part of the plug to the handle.

3. Attachment for broom handles or the like, comprising a tubular plug, a spindle rotatably journaled centrally in the end of the plug, slidably mounted claws movable longitudinally in the end of the plug and means to longitudinally move the claws by rotation of the spindle.

4. Attachments for broom handles or the like, comprising a tubular plug, a spindle rotatably journaled centrally in the end of the plug, claws movable longitudinally in the end of the plug, a pinion attached to the spindle and rack teeth on the claws engaged by the pinion, the spindle being shaped prismatically at one end projecting to the tubular part of the plug, a plate adapted to be attached to the end of the handle, and provided with an opening corresponding to the cross section of the prismatic end of the spindle.

5. An attachment for broom handles or the like, comprising a tubular plug, movable claws, transverse guides on the plug for the claws, means to move the claws longitudinally whereby their ends will project at right angles from the plugs, said means being adapted to be operated by rotating the handle.

AUGUST ADOLF CHARLES OHL.

Witnesses:
EUGENIR HAUSEN,
JOAN BERTHOLDE FELDMANN.

Copies of this patent may be obtained for five cents each, by addressing the "Commissioner of Patents, Washington, D. C."